United States Patent [19]

Konishi et al.

[11] Patent Number: 5,373,064
[45] Date of Patent: Dec. 13, 1994

[54] PROCESS FOR PRODUCING CHLORINATED POLYOLEFIN IN AN AQUEOUS SUSPENSION SYSTEM COMPRISING A METAL SALT OF AN ALKYLDIPHENYL ETHER DISULFONIC ACID

[75] Inventors: Jun Konishi; Kenji Ozaki, both of Kawasaki, Japan

[73] Assignee: Showa Denko K.K., Tokyo, Japan

[21] Appl. No.: 84,450

[22] Filed: Jul. 1, 1993

Related U.S. Application Data

[63] Continuation of Ser. No. 828,230, Jan. 30, 1992, abandoned.

[51] Int. Cl.$^5$ .................................. C08F 8/22
[52] U.S. Cl. .................. 525/357; 525/334.1
[58] Field of Search .................. 525/358, 357

[56] References Cited

U.S. PATENT DOCUMENTS

| | | | |
|---|---|---|---|
| 3,035,038 | 5/1962 | Nolte | 525/358 |
| 3,071,569 | 1/1963 | Hoerger | 525/340 |
| 3,085,074 | 4/1963 | Burke, Jr. | 525/358 |
| 3,454,544 | 7/1969 | Young et al. | |
| 3,759,888 | 9/1973 | Nose et al. | |
| 3,856,891 | 12/1974 | West | 525/358 |
| 3,935,181 | 1/1976 | Lowhardt | |
| 4,252,918 | 2/1981 | Ikeda | 525/358 |
| 4,547,554 | 10/1985 | Kadomatsu et al. | 525/334.1 |
| 4,562,224 | 12/1985 | Busch et al. | 524/519 |

FOREIGN PATENT DOCUMENTS

| | | |
|---|---|---|
| 38-3573 | 4/1963 | Japan . |
| 46-3585 | 1/1971 | Japan . |
| 46-21729 | 6/1971 | Japan . |
| 46-21734 | 6/1971 | Japan . |
| 46-21887 | 6/1971 | Japan . |
| 47-7455 | 3/1972 | Japan . |
| 54-124096 | 9/1979 | Japan . |
| 61-179205 | 8/1986 | Japan . |
| 62-112606 | 5/1987 | Japan . |
| 4716595 | 9/1992 | Japan . |

*Primary Examiner*—Christopher Henderson
*Attorney, Agent, or Firm*—Sughrue, Mion, Zinn, Macpeak & Seas

[57] ABSTRACT

When chlorinating a polyolefin in an aqueous suspension system, a metal salt of an alkyldiphenyl ether disulfonic acid represented by the following formula [I], or together with an anionic surfactant, are each added in an amount of 0.01 to 5% by weight based on the polyolefin, as a suspension stabilizer:

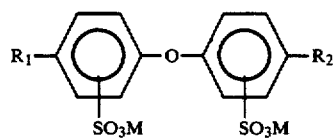

[I]

(wherein $R_1$ represents a hydrogen atom or an alkyl group having 1 to 18 carbon atoms, $R_2$ is an alkyl group having 6 to 36 carbon atoms, and M is an alkali metal or an alkaline earth metal).

4 Claims, No Drawings

PROCESS FOR PRODUCING CHLORINATED POLYOLEFIN IN AN AQUEOUS SUSPENSION SYSTEM COMPRISING A METAL SALT OF AN ALKYLDIPHENYL ETHER DISULFONIC ACID

This is a continuation of application Ser. No. 07/828,230 filed Jan. 30, 1992, now abandoned.

BACKGROUND OF THE INVENTION

1. Field of the Invention

This invention relates to the chlorination of a polyolefin in an aqueous suspension system, and more particularly, to a process for producing a chlorinated polyolefin having a fine particle size and an excellent flexibility and thermal stability.

2. Description of the Related Art

Usually, chlorinated polyolefins are industrially produced by chlorinating polyolefin particles under a considerably high temperature condition in an aqueous suspension system. The various chlorinated polyolefins having characteristics according to the intended use, i.e., from crystalline plastic-like products to noncrystalline rubber-like products, can be produced by appropriately selecting the kinds of starting polyolefins, reaction temperatures, and chlorine contents.

To obtain chlorinated polyolefins having excellent characteristics, it is important to sufficiently disperse the starting polyolefin particles in water. When the starting polyolefin particles are insufficiently dispersed, the chlorine contents in the resultant chlorinated polyolefin particles are largely scattered, or only the surface of the particles is excessively chlorinated, and as a result, nonuniform chlorinated polyolefins are formed. Such chlorinated polyolefins have a poor thermal stability and cause coloration and other problems when molding.

To solve the above-mentioned problems, surfactants including, for example, nonionic surfactants such as ethyleneoxide-propyleneoxide block polymer, polyoxyethylene alkylallyl ether, polyoxyethylene alkyl ether, oxyethylene oxypropylene block polymer; and anionic surfactants such as alkylbenzensulfonic acid salts, alkylnaphthalenesulfonic acid salts, dialkylsulfosuccinic acid salts, alkylphosphoric acid salts, alkylsulfate salts, naphthalenesulfonic acid-formalin condensates, polyoxyethylene alkylsulfuric acid ester are generally added to the aqueous suspension polymerization system.

Nevertheless, in the conventional methods, when a surfactant having a high dispersing effect is used, an extensive foaming occurs in the suspension system, a portion of the polyolefin particles is lifted up to the gas phase with foam, and as a result, that portion is excessively chlorinated. On the other hand, when a less foamable surfactant is used, the chlorine contents between the chlorinated polyolefin particles become nonuniform, due to the poor dispersion.

Furthermore, to maintain a good dispersion during the chlorination reaction, divided additions of the surfactant, or the use of a defoaming agent in the case of an excessive foaming, have been proposed in the art. Nevertheless, the good dispersion conditions are difficult to obtain by these methods, and thus these methods are not industrially effective.

Moreover, when chlorinated polyolefins having an excellent flexibility are produced, the chlorination reaction should be carried out at a temperature near the melting point of the starting polyolefin, and therefore, the surfaces of the polyolefin particles are brought to a semi-molten state. Accordingly, polyolefin particles mutually adhere to each other, and tend to cause agglomeration during the reaction. The agglomerated polyolefin particles are nonuniformly chlorinated, and therefore, the resultant chlorinated polyolefin has poor flexibility. The chlorinated polyolefin thus formed has a large and nonuniform particle size, and the acid and the other impurities contained in the agglomerated particles are not completely removed. Thus, when the produced chlorinated polyolefin is molded and processed, the problems arise of, for example, the occurrence of discoloration and a lowering of the thermal stability. Furthermore, when the chlorinated polyolefin is blended with other resin(s), a poor dispersibility is likely to appear and it becomes difficult to produce a composition having excellent characteristics.

Although the above-mentioned agglomeration of the particles can be prevented to some extent, by lowering the reaction temperature, only a chlorinated polyolefin having a poor flexibility can be obtained. Furthermore, although the agglomeration can be prevented by extremely lowering the amount of the polyolefin, this method is economically disadvantageous from the industrial viewpoint.

As method of preventing an agglomeration of the particles, it is known that relatively inactive substances such as the powder particles of polyvinylchloride (PVC) can be added (see JP-B-38-3573) or inorganic powder particles such as silicon oxide, talc, clay can be added (see U.S. Patent No. 3,454,544). Nevertheless, those methods are not effective unless a large amount of the above-mentioned additives is added, and therefore, a large amount of these additives remains in the product, and thus the use thereof is naturally limited.

In view of the above-mentioned situation in the prior art, various attempts have been made to prevent the mutual agglomeration of the polyolefin particles by adding, as an agglomeration preventing agent, dispersing agents such as polyvinyl alcohol, carboxymethyl cellulose, starch, gelatin; nonionic surfactants such as ethyleneoxide-propyleneoxide block polymer, polyoxyethylene alkylallyI ether, polyoxyethylene alkyl ether, oxyethylene oxypropylene block polymer; and anionic surfactants such as alkylbenzenesulfonic acid salts, alkylnaphthalenesulfonic acid salts, dialkylsulfosuccinic acid salts, alkylphosphoric acid salts, alkylsulfate salts, naphthalenesulfonic acid-formalin condensates, polyoxyethylene alkylsulfuric acid ester.

Nevertheless, in the method of adding a dispersing agent such as polyvinyl alcohol, the polyvinyl alcohol per se is chlorinated and consumed during the reaction and thus the intended effect is reduced, and furthermore, the above-mentioned chlorinated dispersing agent contaminates the product and causes discoloration due to the thermal deterioration thereof during the molding or processing. Moreover, the method of adding a nonionic surfactant such as ethyleneoxide-propyleneoxide block polymer has problems in that the surfactant tends to be gradually decomposed and consumed by the action of hydrochloric acid and hydrochlorous acid formed as a by-product in the chlorination reaction. Therefore, the agglomeration of the particles generally occurs. Accordingly, in these methods, the dispersing agent is added during the reaction, to compensate the consumed amount of the initial dispersing agent, or a larger amount is initially added. Nevertheless, although the unpreferabe agglomeration can be prevented to some extent by these methods, the effects thereof are still not sufficient, and the thermal stability of the product is remarkably lowered by the addition of a large amount of dispersing agents or surfactants.

As mentioned above, the selection of a dispersing agent of agglomeration preventing agent in the production of chlorinated polyolefin is a very important problem, and the desired noncrystalline (or amorphous) chlorinated polyolefin having an excellent flexibility and good thermal stability has not been obtained as yet.

SUMMARY OF THE INVENTION

An object of the present invention is to provide a process for producing a chlorinated polyolefin having an excellent thermal stability.

Another object of the present invention is to provide a process for producing a chlorinated polyolefin having a fine particle size and an excellent flexibility and thermal stability.

In accordance with the present invention, there is provided a process for producing a chlorinated polyolefin in an aqueous suspension system, which comprises adding, as a suspension stabilizer, a metal salt of an alkyldiphenyl ether disulfonic acid represented by the formula [I], shown below preferably in an amount of 0.01% to 5% by weight based on the amount of the polyolefin:

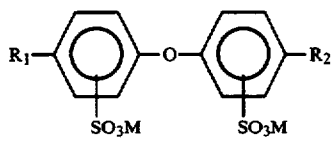

(wherein $R_1$ represents a hydrogen atom or an alkyl group having 1 to 18 carbon atoms, $R_2$ is an alkyl group having 6 to 36 carbon atoms, and M is an alkali metal or an alkaline earth metal).

In accordance with the present invention, there is also provided a process for producing a chlorinated polyolefin in an aqueous suspension system, which comprises adding a metal salt of an alkyldiphenyl ether disulfonic acid represented by the above formula [I] and an anionic surfactant, preferably, each in an amount of 0.01 to 5% by weight based on the polyolefin.

DESCRIPTION OF THE PREFERRED EMBODIMENTS

The polyolefin to be used in the present invention is a homopolymer or a copolymer of α-olefin, as exemplified by polyethylene, polypropylene, ethylenepropylene copolymer, ethylene-1-butene copolymer, ethylene-1-hexene copolymer, propylene-1-butene copolymer, ethylene-1-octene copolymer, ethylene-1,3-butadiene copolymer, ethylene-acrylate copolymer, ethylene-propylene-1,4-hexadiene terpolyner, ethylenemethylmethacrylate-copolymer, and ethylenemethylmethacrylate-maleicanhydride. The molecular weight of the polyolefin is preferably 10,000 to 1,000,000, more preferably 40,000 to 400,000, and the particle size of the polyolefin employed is preferably 50 to 1,000 μm.

The metal salt of the alkyldiphenyl ether disulfonic acid in the present invention (preferably lithium, sodium, potassium, and calcium salts) is represented by the above formula [I]. The amount added of the metal salt is 0.01 to 5% by weight based on the polyolefin, preferably 0.5 to 2% by weight. If the amount added of the metal salt is less than 0.01% by weight, a poor dispersion results, and if the amount added exceeds 5% by weight, the foaming is increased and the thermal stability of the chlorinated polyolefin is undesirably lowered.

The anionic surfactants usable in the present invention are those having, as a hydrophilic group, a group of carboxylic acid, sulfonic acid, sulfuric ester, phosphoric ester or phosphonic acid, or metallic salts thereof.

Typical examples of the anionic surfactant usable in the present invention include (a) polymers of styrene derivatives such as styrene and α-methylstyrene, vinyltoluene, and o-chlorostyrene (all comprehensively referred to herein as styrene type monomers), (b) polymers of vinyl compounds, vinylidene compounds, vinyl heterocyclic compounds and conjugated diene compounds (all comprehensively referred to herein as vinyl type monomers) or condensates thereof, (c) copolymers of the above styrene type monomer with one or two or more kinds of the above vinyl compounds, (d) sulfonated products, sulfuric esters and phosphoric esters of polymeric components such as formalin condensates of naphthalene, and metal salts thereof, and (e) polymers of organic acids having carboxyl groups including carboxylic acids such as acrylic acid and methacrylic acid, dicarboxylic acids such as maleic acid and maleic anhydride, and metal salts thereof. These metals are selected from alkali metals or alkaline earth metals, preferably sodium, potassium, lithium and calcium.

Specific examples thereof include sodium polystyrenesulfonate, formalin condensate of sodium alkylallylsulfonate, formalin condensate of diphenylmethylenesulfonic acid, sodium sulfonate of isobutyrene-styrene copolymer, formalin condensate of calcium β-naphthalenesulfonate, and sodium polyacrylate.

The molecular weight of the surfactant is preferably 100 to 100,000, more preferably 500 to 50,000.

The amount added of the surfactant is 0.01 to 5% by weight based on the polyolefin, preferably 0.5 to 2% by weight. If the amount of the surfactant added is less than 0.01% by weight, agglomeration of the particles is liable to occur, and if it exceeds 5% by weight, the chlorination reaction of the polyolefin may be hindered.

As the polyolefin chlorination method, there can be applied a method conventionally employed in the prior art, such as the methods disclosed in U.S. Pat. Nos. 3,759,888, 3,935,181 and 4,547,554. The chlorine content in the chlorinated polyolefin obtained is preferably 15 to 55% by weight.

EXAMPLES

The present invention will now be further illustrated in detail by, but is by no means limited to, the following Examples, wherein "parts" are all by weight unless otherwise noted.

The states during the reaction, and the characteristics of the chlorinated polyolefin, were determined according to the methods shown below.

For the states during the reaction, the degree of foaming and the dispersion state were observed through a peep-window of an autoclave and;

(1) the foaming degree was evaluated by visual observation according to the following four rankings.
  + +: Substantially no foam
  +: Little foam
  ±: Much foam
  −: Large amount of foam (2) the suspension dispersing state was evaluated by visual observation according to the following four rankings.
 + +: Good dispersion
 +: Generally good dispersion
 ±: Slightly poor dispersion
 −: Poor dispersion
(3) The average particle size was determined by sieving the particles by a mesh sieve according to JIS Z8801 using a shaker, and determining the central value of weight fraction from drawings.
(4) The Mooney viscosity value after 4 minutes was measured by using a small rotor at 100° C., preheated for 1 minute.
(5) Heats of fusion was determined according to JIS K7121 and JIS K7122.
(6) The tensile test was carried out according to JIS K6301, and the 100% and 300% modulus, strength at break, and elongation were measured.
(7) For the thermal stability, the sheet obtained by molding the chlorinated polyolefin by the method described below was left to stand in an air oven at 180° C. for 30 minutes, and then changes in the appearance were determined according to the following four rankings.
 + +: No change
 +: Slightly discolored
 ±: Noticeably discolored
 −: Very discolored

EXAMPLE I-1

Into a 100 liter autoclave were successively charged 80 liters of water, 80 g of sodium dodecyldiphenyl ether disulfonate as the suspension stabilizer, and 10 kg of polyethylene powder (melt index 0.3 g/10 min., density 0.956 g/cm$^3$, average particle size 200 μm), and the chlorination was carried out at 80° to 125° C. to obtain a chlorinated polyethylene having a chlorine content of 35% by weight.

By observation inside of the autoclave during the reaction, it was determined that there was substantially no foaming, and that the dispersion of the particles was good.

EXAMPLE I-2

The chlorination of polyethylene was carried out under the same conditions as in Example I-1, except that the amount of sodium dodecyldiphenyl ether disulfonate was changed to 40 g.

During the reaction, the foaming was still less than in Example I-1, and the dispersion of the particles was good.

EXAMPLE I-3

The chlorination of a polyethylene was carried out under the same conditions as in Example I-1, except that 160 g of sodium dodecyldiphenyl ether disulfonate and 12 kg of polyethylene powder (melt index 6.0 g/10 min., density 0.957 g/cm$^3$, average particle size 250 μm) were used.

During the reaction, there was substantially no foaming, and the dispersion of the particles was good.

EXAMPLE I-4

Into a 100 liter autoclave were successively charged 80 liters of water, 120 g of sodium dodecyldiphenyl ether disulfonate as the suspension stabilizer, and 6 kg of powdered ethylene-propylene copolymer (melt index 1.6 g/10 min., propylene content 30% by weight, average particle size 180 μm), and the chlorination was carried out at 70° to 110° C. to obtain chlorinated ethylenepropylene copolymer having a chlorine content of 35% by weight.

During the reaction, there was substantially no foaming, and the dispersion of the particles was good.

COMPARATIVE EXAMPLE I-1

The chlorination was carried out under the same conditions as in Example I-1, except that 200 g of polyoxyethylene nonyl phenyl ether were used as the suspension stabilizer.

During the reaction, there was much foaming, and therefore, the dispersion state could not be determined. Also, particles were floated due to the poor dispersion thereof in the course of the reaction.

COMPARATIVE EXAMPLE I-2

The chlorination was carried out under the same conditions as in Example I-1, except that 160 g of sodium dodecylbenzenenesulfonate were used as the dispersion stabilizer.

During the reaction, there was much foaming, the suspension dispersion state was slightly poor, and particles were floated due to poor dispersion thereof in the course the reaction.

COMPARATIVE EXAMPLE I-3

The chlorination was carried out under the same conditions as in Example I-1 except for adding 160 g of sodium dodecylbenzenesulfonate as the suspension stabilizer before the reaction, and in portions as appropriate during the reaction.

During the reaction, there was much foaming but the dispersion state was slightly better than in Comparative Example I-2.

COMPARATIVE EXAMPLE I-4

The chlorination was carried out under the same conditions as in Example I-1, except for using 160 g sodium dodecylbenzenesulfonate as the suspension stabilizer and 20 g of a silicone defoaming agent containing the emulsion-type silica gel, in combination.

At the initial stage of the reaction, there was substantially no foaming, but gradually the foaming increased until, at the latter half of the reaction, the defoaming effect was substantially lost. Also, the dispersion state was poor throughout the whole reaction, and the particles were floated in the course of the reaction.

The results of the observations made during the reaction, as described above, are summarized in Table 1.

Also, to 100 parts of the respective chlorinated polyolefins obtained in Examples I-1 to I-4 and Comparative Examples I-1 to I-4 were added 2 parts of dioctyl tin maleate polymer (produced by Sankyo Yuki Gosei K.K.) as the stabilizer, and the mixture was roll kneaded at 130° C. for 5 minutes. Each sheet was then pressed at 140° C. and 150 kg/cm$^2$G for 5 minutes, to form a test sheet with a thickness of 1 mm. The results of the tensile test and thermal stability of the sheets are shown in Table 1.

TABLE 1

|  |  |  | Example | | | | Comparative Example | | | |
| --- | --- | --- | --- | --- | --- | --- | --- | --- | --- | --- |
|  |  |  | I-1 | I-2 | I-3 | I-4 | I-1 | I-2 | I-3 | I-4 |
|  | Foaming degree |  | ++ | ++ | ++ | ++ | − | ± | ± | + |
|  | Dispersion state |  | ++ | ++ | ++ | ++ | *1 | ± | ± | − |
| Tensile | 100% modulus | (kg/cm$^2$) | 12 | 13 | 11 | 11 | 13 | 13 | 14 | 15 |
| test | Strength at break | (kg/cm$^2$) | 125 | 130 | 100 | 40 or more | 125 | 135 | 130 | 135 |
|  | Elongation | (%) | 680 | 630 | 720 | 1200 | 580 | 600 | 580 | 560 |
|  | Thermal stability |  | ++ | ++ | ++ | ++ | ± | ± | + | ± |

*1: No determination possible.

From the above-mentioned results, it is evident that no substantial foaming occurs during the chlorination reaction and the dispersion conditions were good, and that the chlorinated polyolefin according to the present invention has a superior flexibility and an excellent thermal stability.

In addition to the above-mentioned Examples, further improved Examples will be illustrated below.

EXAMPLE II-1

Into a 100 liter autoclave were charged 80 liters of water, 80 g of sodium dodecyldiphenyl ether disulfonate (hereinafter called DPES), 80 g of sodium polystyrenesulfonate having a molecular weight of 22000 (hereinafter called PSNa) and 10 kg of polyethylene powder (melt index 0.3 g/10 min., density 0.956 g/cm$^3$, average particle size 200 μm), and the chlorination was carried out at 90° to 130° C. to obtain chlorinated polyethylene having a chlorine content of 35% by weight.

During the reaction, it was determined that there was substantially no foaming, and that dispersion of the particles was good.

EXAMPLE II-2

The chlorination of the polyethylene was carried out under the same conditions as in Example II-1, except that 40 g of DPES and 60 g of PSNa were used.

During the reaction, the foaming was less than in Example II-1, and dispersion of the particles was generally good.

EXAMPLE II-3

The chlorination of the polyethylene was carried out under the same conditions as in Example II-1, except that 80 g of sodium sulfonate of an isobutylene-styrene copolymer was used instead of PSNa.

Observation of inside of the autoclave during the reaction showed that there was substantially no foaming, and that dispersion of the particles was good.

EXAMPLE II-4

The chlorination was carried out under the same conditions as in Example II-1, except that 12 kg of polyethylene powder was used (melt index 6.0 g/10 min., density 0.957 g/cm$^3$, average particle size 250 μm).

During the reaction, there was substantially no foaming and dispersion of the particles was good.

EXAMPLE II-5

Into a 100 liter autoclave were successively charged 80 liters of water, 120 g of DPES, and 100 g of PSNa, 6 kg of an ethylene-propylene copolymer powder (melt index 1.6 g/10 min., propylene content 30% by weight, average particle size 180 μm), and the chlorination was carried out at 70° to 110° C. to obtain chlorinated polyethylene having a chlorine content of 35% by weight.

During the reaction, there was substantially no foaming and dispersion of the particles was good.

COMPARATIVE EXAMPLE II-1

The chlorination was carried out under the same conditions as in Example II-1 except that 200 g of polyoxyethylene nonyl phenyl ether were used instead of DPES.

During the reaction, there was a large amount of foaming, and therefore, the dispersion state could not be determined. Also, the particles were floated due to a poor dispersion in the course of the reaction.

COMPARATIVE EXAMPLE II-2

The chlorination was carried out under the same conditions as in Example II-1, except that 160 g of sodium dodecylbenzenesulfonate were used instead of DPES.

During the reaction, there was much foaming, the dispersion was not good, and the particles were floated due to a poor dispersion was seen in the course of the reaction.

COMPARATIVE EXAMPLE II-3

The chlorination was carried out under the same conditions as in Example II-1, except that 100 g of polyoxyethylene nonyl phenyl ether were used instead of PSNa.

During the reaction there was little foaming, and the dispersion was good.

COMPARATIVE EXAMPLE II-4

The chlorination was carried out under the same conditions as in Example II-1, except that PSNa was not added. During the reaction there was little foaming, and the dispersion was good.

COMPARATIVE EXAMPLE II-5

The chlorination was carried out under the same conditions as in Example II-1 except that DPES was not added.

During the reaction there was little foaming, but the dispersion was poor and the particles were floated due to a poor dispersion in the course of the reaction.

For the respective chlorinated polyolefin powders obtained in Examples II-1 to II-5 and Comparative Examples II-1 to II-5, the average particle size, Mooney viscosity and Heat of fusion were measured and the results are shown in Table 2. Also, to 100 parts of the chlorinated polyolefin were added 2 parts of dioctyl tin maleate polymer (produced by Sankyo Yuki Gosei K.K.) as the stabilizer, and the mixture was roll kneaded at 130° C. for 5 minutes. Each sheet was then pressed at 140° C. and 150 kg/cm$^2$G for 5 minutes to form a test sheet with a thickness of 1 mm. The tensile test and the thermal stability test were conducted for the sheets, and the results are shown in Table 2.

TABLE 2

|  |  | Example | | | | | Comparative Example | | | | |
|---|---|---|---|---|---|---|---|---|---|---|---|
|  |  | II-1 | II-2 | II-3 | II-4 | II-5 | II-1 | II-2 | II-3 | II-4 | II-5 |
|  | Average particle size (μm) | 220 | 210 | 220 | 270 | 220 | 230 | 220 | 380 | 500 | 230 |
|  | Mooney viscosity | 41 | 40 | 44 | 48 | 32 | 55 | 52 | 59 | 54 | 62 |
|  | Heat of fusion (cal/g) | 0.1 or less | 0.1 or less | 0.1 or less | 0.1 or less | 0.1 or less | 1.5 | 2.0 | 1.2 | 1.3 | 2.2 |
| Tensile test | 100% modulus (kg/cm$^2$) | 8 | 8 | 9 | 9 | 8 | 13 | 12 | 15 | 12 | 20 |
|  | 300% modulus (kg/cm$^2$) | 12 | 10 | 11 | 13 | 9 | 18 | 15 | 22 | 19 | 27 |
|  | Strength at break (kg/cm$^2$) | 120 | 115 | 120 | 20 | 40 or more | 125 | 120 | 120 | 125 | 110 |
|  | Elongation (%) | 830 | 870 | 820 | 900 | 1200 | 600 | 620 | 630 | 680 | 580 |
|  | Thermal stability | ++ | ++ | ++ | ++ | ++ | ± | + | ++ | ++ | − |

From the above results, it is evident that the chlorinated polyolefin obtained according to the production process of the present invention has a fine particle size, an excellent flexibility, and an excellent thermal stability.

The chlorinated polyolefin obtained according to the production process of the present invention is useful in fields where a heat resistance is particularly demanded, such as for office automation instruments and domestic (or household) electric appliances, etc., and useful for such purposes as a coating material of electric wire and rubber parts, etc., where a flexibility is also demanded.

Also, according to the present invention, since dispersion of the particles during the reaction is good, it is also possible to increase the charged amount of the polyolefin by about 2-fold that of the conventional method, and the industrial effect thereof is great.

We claim:

1. A process for producing a chlorinated polyolefin in an aqueous suspension system, which comprises adding a metal salt of an alkyldiphenyl ether disulfonic acid represented by the following formula (I) as a suspension stabilizer:

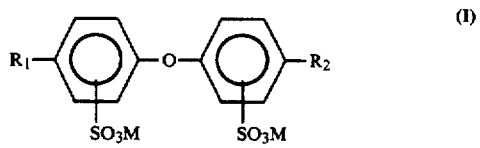

(I)

wherein $R_1$ represents a hydrogen atom or an alkyl group having 1 to 18 carbon atoms, $R_2$ is an alkyl group having 6 to 36 carbon atoms, and M is an alkali metal or an alkaline earth metal.

2. A process as claimed in claim 1, wherein an anionic surfactant is further added as a suspension stabilizer.

3. A process as claimed in claim 2, wherein the amount added of said surfactant is 0.01 to 5% by weight based on the polyolefin.

4. A process as claimed in claim 3, wherein the added amount of the metal salt of the alkyldiphenyl ether disulfonic acid is 0.01 to 5% by weight based on the polyolefin.

* * * * *